(12) United States Patent
Peng et al.

(10) Patent No.: US 12,048,899 B2
(45) Date of Patent: Jul. 30, 2024

(54) HOLLOW FIBER MEMBRANE AND ITS PREPARATION METHOD AND APPLICATION

(71) Applicant: BEIJING UNIVERSITY OF TECHNOLOGY, Beijing (CN)

(72) Inventors: Yuelian Peng, Beijing (CN); Songchen Xie, Beijing (CN); Yue Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 684 days.

(21) Appl. No.: 17/057,673

(22) PCT Filed: Dec. 20, 2019

(86) PCT No.: PCT/CN2019/127058
§ 371 (c)(1),
(2) Date: Nov. 22, 2020

(87) PCT Pub. No.: WO2020/228328
PCT Pub. Date: Nov. 19, 2020

(65) Prior Publication Data
US 2021/0197135 A1    Jul. 1, 2021

(30) Foreign Application Priority Data
May 10, 2019   (CN) .......................... 201910387809.7

(51) Int. Cl.
*B01D 69/08*   (2006.01)
*B01D 61/36*   (2006.01)
(Continued)

(52) U.S. Cl.
CPC ......... *B01D 69/088* (2013.01); *B01D 61/364* (2013.01); *B01D 67/00165* (2022.08);
(Continued)

(58) Field of Classification Search
CPC ............ B01D 2323/08; B01D 2323/12; B01D 2323/22; B01D 61/364; B01D 67/0016;
(Continued)

(56) References Cited

U.S. PATENT DOCUMENTS 6,632,366 B1 * 10/2003 Nakatsuka ............. B01D 69/08
264/41
2004/0028875 A1 * 2/2004 Van Rijn ................ B01L 3/5085
264/299
(Continued)

FOREIGN PATENT DOCUMENTS

CN      101721928 A    6/2010
CN      105214526 A    1/2016

OTHER PUBLICATIONS

Liu et al., Characterization of morphology controlled polyethersulfone hollow fiber membranes by the addition of polyethylene glycol to the dope and bore liquid solution, 223 J. Membrane Sci., 187, 187-199 (2003). (Year: 2003).*

*Primary Examiner* — Dirk R Bass
(74) *Attorney, Agent, or Firm* — Leonid Kisselev

(57) ABSTRACT

This invention discloses a hollow fiber membrane and its preparation method and application, belonging to the field of membrane separation. The preparation method adopts a spinning device with a triple-orifice spinneret, including the casting solution, bore fluid and outer solution. The bore fluid, casting solution and outer solution are respectively co-extruded from the inner, middle and outer orifice of the spinneret, respectively, to form the nascent membrane. The nascent membrane is immersed in external coagulation bath to form a hollow fiber membrane. The outer solution and bore fluid are weakly-polar non-solvents of membrane-forming material and are water soluble. Based on the characteristics of the bore fluid and the outer solution, on the one hand, the mass exchange rate between solvents and non-
(Continued)

solvents can be slowed down, the formation of dense skin is effectively avoided, and the surface porosity of the membrane is improved. On the other hand, the liquid film between solvents and non-solvents can finally dissolve in the coagulation bath without remaining in the hollow fiber membrane and spinning device. The hollow fiber membrane is prepared without double dense skins, and the surface porosity of the inner and outer surfaces of the hollow fiber membrane is improved, which is good for the improvement of membrane flux.

4 Claims, 5 Drawing Sheets

(51) Int. Cl.
*B01D 67/00* (2006.01)
*B01D 71/34* (2006.01)
*B01D 71/68* (2006.01)

(52) U.S. Cl.
CPC ........... *B01D 69/085* (2013.01); *B01D 71/34* (2013.01); *B01D 71/68* (2013.01); *B01D 2323/08* (2013.01); *B01D 2323/12* (2013.01); *B01D 2323/22* (2013.01)

(58) Field of Classification Search
CPC .. B01D 69/085; B01D 69/087; B01D 69/088; B01D 71/34; B01D 71/68; B01D 67/00165
See application file for complete search history.

(56) References Cited

U.S. PATENT DOCUMENTS

2004/0149127 A1* 8/2004 Lyons .................. B01D 69/12
95/45
2010/0058926 A1 3/2010 Yates et al.

* cited by examiner

HOLLOW FIBER MEMBRANE AND ITS PREPARATION METHOD AND APPLICATION

CROSS REFERENCE TO RELATED APPLICATION

This application is a national stage application of International application number PCT/CN2019/127058, filed Dec. 20, 2019, titled "A Hollow Fiber Membrane And Its Preparation Method and Application", which claims the priority benefit of Chinese Patent Application No. 201910387809.7, filed on May 10, 2019, which is hereby incorporated by reference in its entirety.

TECHNICAL FIELD

The invention relates to the field of separation membrane, in particular to a hollow fiber membrane and its preparation method and application.

BACKGROUND

As a common separation membrane, hollow fiber membrane is widely used in the field of membrane separation. For example, it can be used in the process of membrane distillation. It has the advantages of low operating pressure, low operating temperature and high separation efficiency.

At present, hollow fiber membrane is usually prepared by composite thermophilic phase separation (c-TIPS), and a spinning device with a double orifice spinneret is used in the preparation process. The casting solution is extruded from the outer channel of the double orifice spinneret to form the nascent fibers. The bore fluid is extruded from the inner channel of the double orifice spinneret, which is in the center of nascent fibers. Subsequently, the nascent fibers are solidified into hollow fiber membrane in the coagulation bath.

However, the inventors find that the existing technology has the following shortcomings. After entering into the coagulation bath, the solvent in the nascent fiber is rapidly exchanged with the external coagulation bath (non-solvent), and it was easy to form double dense skins and fingerlike macro-pores, so that the hollow fiber membrane had double dense skins, which is not good for the improvement of permeate flux.

SUMMARY

The invention discloses a hollow fiber membrane and its preparation method and application, which can solve the technical problems mentioned above. Specifically, it includes the following technical ways:

The invention relates to a preparation method of hollow fiber membranes, which adopts a spinning device with a triple-orifice spinneret;

The preparation method requires the provision of a casting solution, a bore fluid and an outer solution;

The bore fluid, the casting solution and the outer solution are respectively co-extruded (i.e., extruded simultaneously) through an inner, a middle and an outer orifice of the triple-orifice spinneret to form nascent membranes;

The nascent membranes are immersed in an external coagulation bath to form the hollow fiber membrane;

The outer solution and the bore fluid are weakly-polar non-solvents of the membrane-forming material and are water soluble.

In one embodiment, the temperature of casting solution is 80° C.-180° C.

In one embodiment, the outer solution and the bore fluid are selected from a group consisting an alcohol solution and a glycerin solution.

In one embodiment, the alcohol solution is selected from polyethylene glycol 200, polyethylene glycol 400, polyethylene glycol 600, polyethylene glycol 800, diethylene glycol, ethylene glycol and ethanol.

In one embodiment, the outer solution and/or the bore liquid also includes a solvent used to dissolve the membrane-forming material.

In one embodiment, the outer solution, the casting solution, and the bore fluid are co-extruded (i.e., extruded simultaneously) through a triple-orifice spinneret, and their flowrates are controlled within 10-30 ml/L.

In one embodiment, the microstructure of the hollow fiber membrane is controlled by adjusting the composition or temperature of the outer solution, the bore fluid, or the external coagulation bath.

In one embodiment, the temperature of the outer solution and/or the bore fluid is 20° C.-120° C.

The temperature of the coagulation bath is 20° C.-60° C.

In one aspect, a hollow fiber membrane is provided, and the hollow fiber membrane is prepared by any preparation methods disclosed above.

In another aspect, the application of the hollow fiber membrane in membrane separation (separation using membrane) is provided.

The beneficial effects of this technical scheme provided by embodiments include at least the following:

The invention implementation example provides a preparation method of hollow fiber membrane adopting a simultaneous co-extrusion process. The casting solution is extruded through the middle channel of the triple orifice spinneret to form the nascent hollow fiber. The outer solution is extruded from the external channel, which forms a liquid film on the external surface of the nascent fiber. The bore fluid is extruded from the inner channel, which forms the liquid film on the inner surface of the nascent fiber. After the nascent fiber enters into the coagulation bath, since the outer solution and bore fluid are weak polar non-solvents, on the one hand, it can slow down the mass exchange rate between the solvent and non-solvent, which effectively avoids the formation of dense skins, and helps to improve the surface porosity of membrane; On the other hand, as the outer solution and inner bore liquid are water-soluble, the formed liquid film will eventually dissolve in coagulation bath and will not remain in the hollow fiber membrane and spinning device. There are no double dense skins in the hollow fiber membrane prepared by the embodiment of this invention, and the porosity of inner and outer surfaces can be improved, which is good for the improvement of permeate flux.

DESCRIPTION OF DRAWINGS

In order to clearly illustrate the technical scheme in the embodiments of this invention, the appended pictures required for the description of the invention examples will be briefly introduced below. Obviously, the appended pictures described are only a part of embodiments of this invention. For any ordinary technicians in this field, other appended pictures can be obtained according to these pictures on the premise of no creative work.

DETAILED DESCRIPTION OF THE PREFERRED EMBODIMENTS

Figure 1:
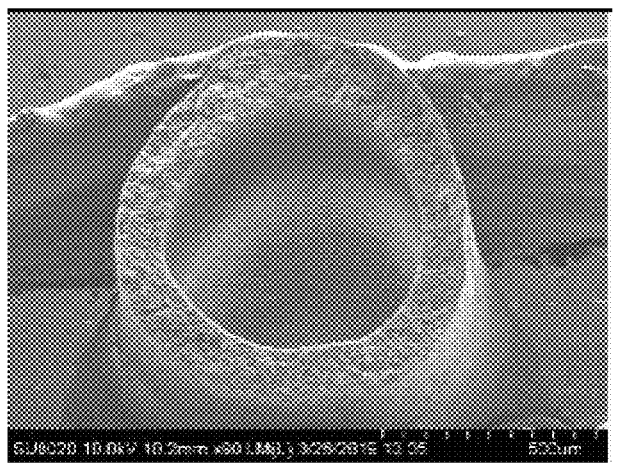
FIG. 1 shows the cross-section SEM micrograph of hollow fiber membrane prepared in embodiment 1.
Figure 2:
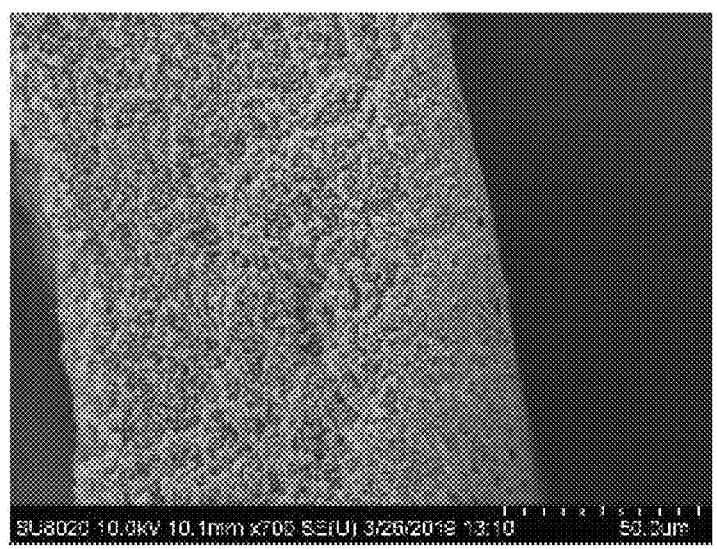
FIG. 2 shows the amplified SEM micrograph of local section of hollow fiber membrane prepared in embodiment 1.
Figure 3:
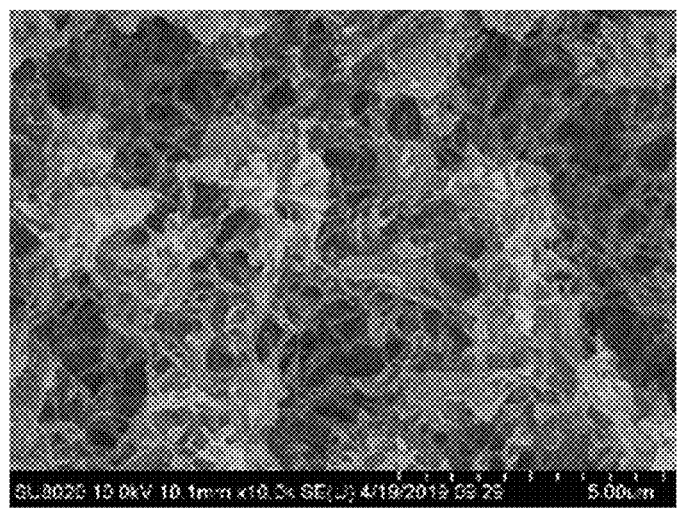
FIG. 3 shows the inner surface SEM micrograph of hollow fiber membrane prepared in embodiment 1.
Figure 4:
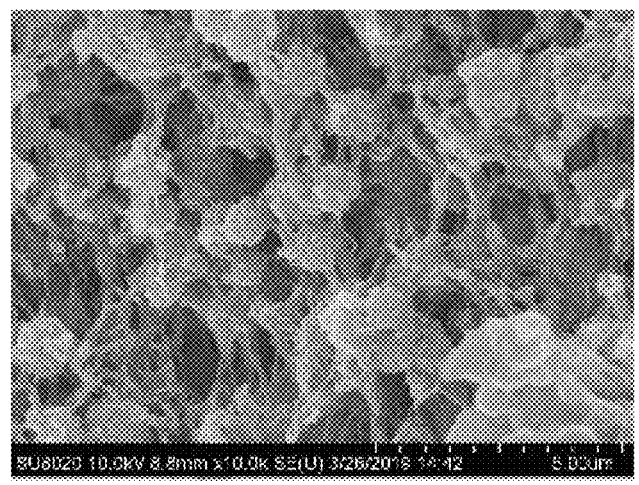
FIG. 4 shows the outer surface SEM micrograph of hollow fiber membrane prepared in embodiment 1.
Figure 5:
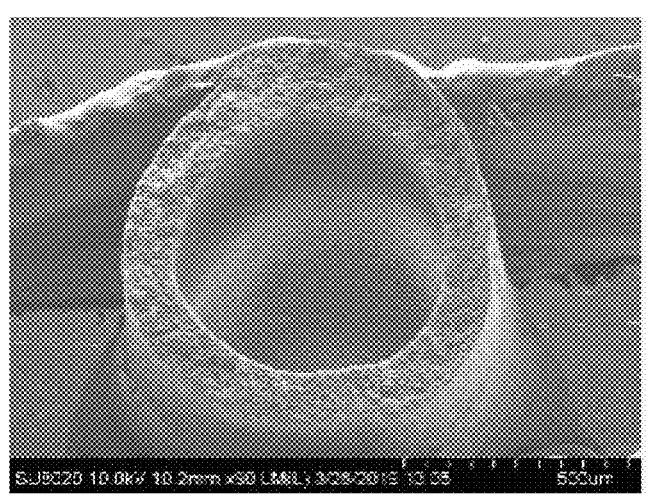
FIG. 5 shows the cross section SEM micrograph of hollow fiber membrane prepared in embodiment 2.
Figure 6:
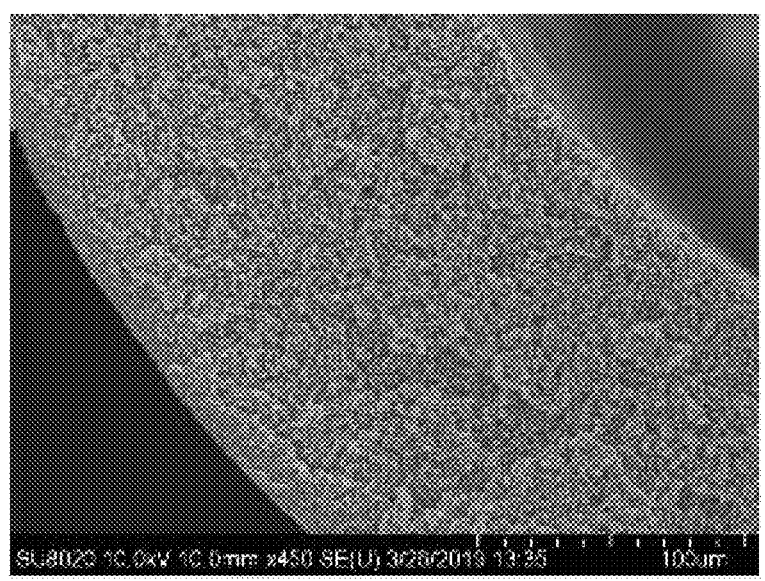
FIG. 6 shows the amplified SEM micrograph of local section of hollow fiber membrane prepared by embodiment 2.
Figure 7:
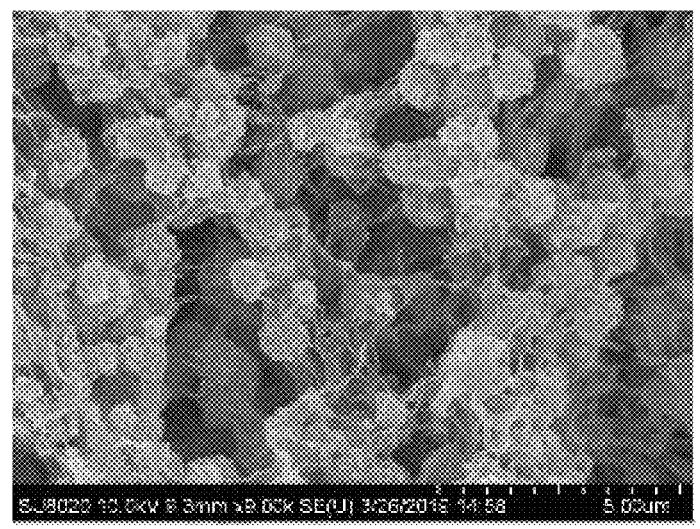
FIG. 7 shows the inner surface SEM micrograph of hollow fiber membrane prepared in embodiment 2.
Figure 8:
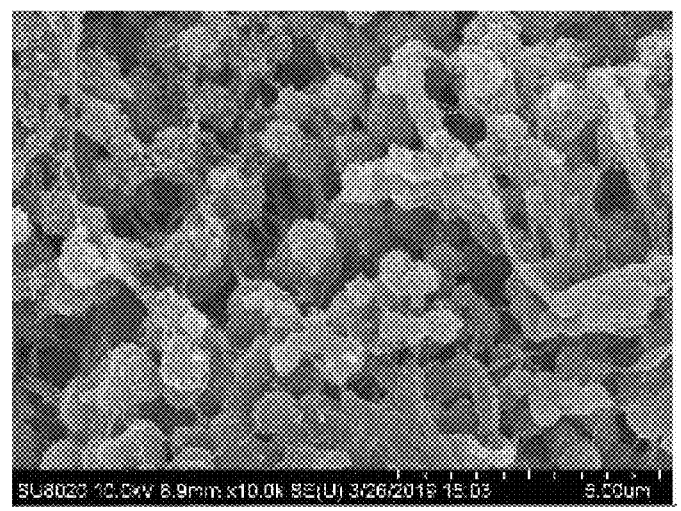
FIG. 8 shows the outer surface SEM micrograph of hollow fiber membrane prepared in embodiment 2.

In order to make the technical scheme and advantages of this invention clear, the embodiments will be further described in combination with the attached pictures.

It should be noted that the casting solution refers to a membrane-forming solution, which can be used to prepare a hollow fiber membrane. The casting solution includes polymers, solvents for dissolving the polymers, and pore-forming additives.

The spinning device with a triple-orifice spinneret mentioned in the embodiment is also common in this field and can be purchased on the market. For a triple-orifice spinneret, the outer and middle channels are annular channels, while the inner can be cylindrical channels. For example, a triple-orifice spinneret sold by Shanghai Zhanxin Technology Development Co., Ltd. (China) can be applied in this invention.

In order to remove the double dense skin existing in hollow fiber membrane, this invention provides a new method to prepare hollow fiber membrane with porous skins, which is characterized in the use of a spinning device with a triple-orifice spinneret. The preparation method includes provisions of casting solution, bore fluid and outer solution. The bore fluid, casting solution and outer solution are pumped through the inner, middle and outer channels of the spinneret, respectively, to form the nascent fiber, and which is immersed in external coagulation bath to form hollow fiber membrane.

The outer solution is extruded through the outer channel of the triple-orifice spinneret to form a liquid film on the external surface of the nascent fiber. The bore fluid is extruded through the inner channel to form a liquid film on the inner surface of the nascent fiber. After the nascent fiber enters into the coagulation bath, since the outer solution and bore fluid are weak polar non-solvents, it can slow down the mass exchange rate between the solvent and the non-solvent, which effectively avoids the formation of double dense skins, and help to improve the porosity of the membrane. On the other hand, as the outer solution and bore liquid are water-soluble, the formed liquid film will eventually dissolve in the coagulation bath and will not remain in the hollow fiber membrane and spinning device. There is no double dense skin in the hollow fiber membrane prepared in the embodiments of this invention, and the porosity of the inner and outer surfaces can be improved (the overall porosity of hollow fiber membrane greatly increases), which is good for the improvement of permeate flux.

In the embodiments of this invention, the outer solution and bore fluid are the same or be different. As an example, the outer solution and bore fluid can be selected from alcohol solution and glycerol solution.

For example, the alcohol solution is one of polyethylene glycol 200, polyethylene glycol 400, polyethylene glycol 600, polyethylene glycol 800, diethylene glycol, ethylene glycol and ethanol.

Glycerol solutions may be selected from glycerol and/or glycerol aqueous solutions.

In one possible implementation, an acidic surfactant solution or an alkaline surfactant solution may be used as the bore fluid and the outer solution.

Furthermore, the outer solution and/or bore fluid provided by the embodiments of this invention may also include solvents, which can slow down the membrane formation process and facilitate expansion of membrane pore. In this way, the mass percentage of solvent in outer solution or bore fluid can be less than or equal to 40%, for example, it can be 5%, 10%, 15%, 20%, 25%, 30%, 35%, etc.

The size and wall thickness of hollow fiber can be controlled by adjusting the flowrate of casting solution, the size of hollow fiber can be controlled by adjusting the flowrate of bore fluid, and the thickness of liquid film can be controlled by adjusting the flowrate of outer solution. Specifically, the outer solution should uniformly cover the outer surface of nascent fiber, playing a role in temperature regulation and phase separation control. If the flowrate of outer solution is too low, the nascent fiber cannot be completely covered, and then a uniform liquid film cannot be formed; if the flowrate is too high, gravity exerts a natural pull straight downwards on the nascent fiber and the membrane pore will be too large, so the flowrate of outer solution must be controlled within the expected range. The bore fluid not only regulates the temperature of nascent fiber and controls the phase separation process, but also regulates diameter and thickness of fiber.

In summary, in order to prepare a hollow fiber with desired size and wall thickness, the flowrate of outer solution, casting solution and bore fluid during co-extrusion should be controlled within 10-30 ml/L, such as 10 ml/L, 15 ml/L, 20 ml/L, 25 ml/L and 30 ml/L, etc. The flowrates through three orifices can be the same or be different.

The microstructure of hollow fiber can be controlled by adjusting the composition or temperature of casting solution, outer solution, bore liquid and coagulation bath. In order to adjust the pore size of membrane, the phase separation process can be controlled by adjusting the composition or temperature of casting solution, outer solution, bore liquid and coagulation bath, which includes the exchange rate between the solvent in the casting solution and coagulation bath, bore liquid and outer solution, and the cooling rate of nascent fiber, to realize the accurate control of thermally induced phase separation (TIPS) and non-solvent induced phase separation (NIPS).

For example, the compositions of outer solution and bore fluid determine whether NIPS process occurs in the nascent fiber during the air-gap. If the outer solution and bore fluid are strong non-solvents of polymer, such as water, once nascent fiber contacts with outer solution and bore fluid, water will exchange with the solvent and hydrophilic additives in nascent fiber in two directions. The polymer concentration increases rapidly in inner and outer skins. Finally, the nascent fiber solidifies and two dense skins form.

When the outer solution and bore fluid are weak polar non-solvent of the polymer, such as alcohols, when the nascent fiber contacts with the outer solution and bore fluid, although there exists mass exchange, the polymer does not immediately solidify and dense skins don't form, thus NIPS process is delayed during the air-gap, and TIPS process dominates the phase separation and a hollow fiber with porous surfaces and bi-continuous cross section forms.

The temperatures of outer solution and bore fluid affect the temperature of the nascent fiber during the air-gap. If the temperatures of outer solution and bore fluid are low, they greatly cool the nascent fiber, and TIPS occurs before NIPS; if the temperatures of outer solution and bore fluid are high, or close to the temperature of nascent fiber, firstly TIPS and then NIPS occurs after the nascent fiber enters into coagulation bath.

In the embodiments, to obtain a hollow fiber membrane with an appropriate pore size, such as a microfiltration membrane, the temperature of outer solution and/or bore fluid can be set at 20° C.-120° C., such as 20° C., 40° C., 60° C., 80° C., 100° C., 120° C., etc. (The temperature of outer solution and bore fluid can be the same or different). The temperature of coagulation bath can be 20° C.-60° C., such as 20° C., 30° C., 40° C., 50° C., 60° C., etc.

As mentioned above, the casting solution includes polymers, solvents and additives. It is true that all the casting solution suitable for the preparation of hollow fiber membranes are applicable to this invention. Examples of each components are given below:

For polymers, they may include but are not limited to polyvinylidene fluoride polymer, polysulfone, polyethersulfone, sulfonated polysulfone, sulfonated polyethersulfone, polyacrylonitrile, cellulose acetate, etc.

For solvents, they may include but are not limited to N,N-dimethyl acetamide, N,N-dimethyl formamide, triethyl phosphate, dimethyl sulfoxide, and N-methyl pyrrolidone.

For additives, they may include but are not limited to diethylene glycol, ethylene glycol, glycerin, polyethylene glycol with different molecular weights, inorganic salts (such as LiCl), and polyvinylpyrrolidone.

In the casting solution, the mass percentage of polymers, solvents and additives can be 13-35%, 40-85% and 2-25%, respectively.

The above components can be mixed and stirred evenly at 80-180° C. to obtain a uniform casting solution. During the spinning process, the temperature of the casting solution can be kept at 80-180° C., such as 80° C., 100° C., 110° C., 120° C., 130° C., 140° C., 150° C., 160° C., 170° C., etc. In this way, the thermally induced phase separation of the casting solution can be ensured.

In the embodiments, the coagulation bath may include but is not limited to water or a mixture of water with triethyl phosphate, N,N-dimethyl acetamide, N,N-dimethyl formamide, dimethyl sulfoxide, and N-methyl pyrrolidone.

How to prepare a hollow fiber membrane by a spinning device is not specified in the embodiments. It should be noted that the hollow fiber membrane taking out of coagulation bath can be soaked in water to remove the residual solvent and additive, and it also can be soaked in ethanol to further remove the residual solvent and additive, and then be dried.

In order to optimize the scheme, the nascent fiber firstly evaporates in air before entering the coagulation bath, and the air-gap length can be less than 10 cm. During the air-gap, nascent fiber is stretched for gravity and larger pore in membrane is induced.

In order to optimize the scheme, when the nascent fiber is co-extruded through the triple-orifice spinneret, it enters into the coagulation bath for gravity or by adjusting the winding speed. In order to stretch the nascent fiber and enlarge its pore, the winding speed can be controlled at 20-60 m/min, such as 20 m/min, 40 m/min and 60 m/min, etc.

On the other hand, the embodiments also provide a hollow fiber membrane, which can be prepared by any preparation methods mentioned above.

Compared with the existing technology, the hollow fiber membrane provided by the embodiments is free of dense skins, has porous inner and outer surfaces, which is of great significance for improving permeate flux.

As an example, the hollow fiber prepared in the embodiment is a microfiltration membrane.

On the other hand, the embodiments also provide the application of hollow fiber membrane in separation. For example, the membrane separation mentioned above includes but is not limited to membrane distillation, ultrafiltration, microfiltration, etc.

The invention is further described by the following specific embodiments:

Embodiment 1

(1) Preparation of Outer Solution, Casting Solution and Bore Fluid

Outer solution was an aqueous solution of glycerol (20% by mass of glycerol). Casting solution included polyvinylidene fluoride (polymer), triethyl phosphate (solvent), polyethylene glycol 200 (additive). The three substances were uniformly mixed at 150° C. according to the mass percentage of 30%, 50% and 20%, respectively. Bore fluid was polyethylene glycol 200, and coagulation bath was water.

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 20 ml/min, 18 ml/min and 18 ml/min, respectively. The temperatures of the casting solution, bore fluid and outer solution were 120° C., 150° C. and 120° C.

After evaporating in a 5 cm air-gap, the nascent fiber entered into a coagulation bath at 20° C. to solidify. Membrane was subsequently collected with a winding speed of 20 m/min.

(3) Post-Treatment of Hollow Fiber Membrane

The collected hollow fibers were soaked in aqueous ethanol with different concentration in turn for 1 hour, and the residual solvents and additives were removed and then dried in air.

The hollow fiber membrane prepared in this embodiment was observed by electron microscopy, and the relevant SEM images were shown in FIGS. 1-4, respectively. From FIGS. 1-4, it could be seen that expected microporous inner and outer surfaces existed, and dense skins disappeared.

The physical parameters of hollow fiber membrane prepared in this embodiment were tested, and the test results were shown as the following: The average and maximum pore diameters were 0.221 μm and 0.234 μm, respectively. The total porosity was 65%, indicating that the hollow fiber membrane prepared in this embodiment was a typical microfiltration membrane, and it could be used in membrane distillation.

Hollow fiber membrane provided in this embodiment was used in direct-contact membrane distillation (DCMD). When the hot and cold side liquid was pure water at 20° C. and 70° C. respectively, its permeate flux was 20 kg·m$^{-2}$h$^{-1}$. Compared with the existing technology, the hollow fiber membrane provided in this embodiment had great significance in improving the permeate flux.

Embodiment 2

(1) Preparation of Outer Solution, Casting Solution, Bore Fluid.

Outer solution was an aqueous solution of polyethylene glycol 600. Casting solution includes polyvinylidene fluoride (polymer), the mixture of triethyl phosphate and N,N-dimethyl acetamide (10% by mass) (solvent) and glycerin (additive). The three substances were uniformly mixed at 180° C. according to the mass percentage of 30%, 50% and 20%, respectively. Bore fluid was polyethylene glycol 400 and coagulation bath was a mixture of water and N,N-dimethyl acetamide(mass percentage 10%).

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 20 ml/min, 18 ml/min and 18 ml/min, respectively. The temperatures of the casting solution, bore fluid and outer solution were 120° C., 180° C. and 120° C.

After evaporating in a 1 cm air-gap, the nascent fiber entered into a coagulation bath at 20° C. to solidify. Membrane was subsequently collected with a winding speed of 25 m/min.

(3) Post-Treatment of Hollow Fiber Membrane

The collected hollow fibers were soaked in aqueous ethanol with different concentration in turn for 1 hour, and the residual solvents and additives were removed and then dried in air.

The hollow fiber membrane prepared in this embodiment was observed by electron microscopy, and the relevant SEM images were shown in FIGS. 5-8, respectively. From FIGS. 5-8, it could be seen that expected microporous inner and outer surfaces existed, and dense skins disappeared.

The physical parameters of hollow fiber membrane prepared in this embodiment were tested, and the test results were shown as the following: The average and maximum pore diameters were 0.278 μm and 0.307 μm, respectively. The total porosity was 68%, indicating that the hollow fiber membrane prepared in this embodiment was a typical microfiltration membrane, and it could be used in membrane distillation.

Hollow fiber membrane provided in this embodiment was used in DCMD. When the hot and cold side liquid was pure water at 20° C. and 70° C. respectively, its permeate flux was 25 kg·m$^{-2}$h$^{-1}$. Comparing with the existing technology, the hollow fiber membrane provided in this embodiment had great significance in improving the permeate flux.

Embodiment 3

(1) Preparation of Outer Solution, Casting Solution, Bore Fluid.

Outer solution was polyethylene glycol 200. Casting solution included polysulfone (polymer), N,N-dimethyl acetamide (solvent) and glycerin (additive). The three substances were uniformly mixed at 120° C. according to the mass percentage of 20%, 68% and 12%, respectively. Bore fluid was polyethylene glycol 200 and the coagulation bath was a mixture of water and N,N-dimethyl acetamide (mass percentage 10%).

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 14 ml/min, 13 ml/min and 15 ml/min, respectively. The temperature of the outer solution, casting solution and bore fluid were 80° C., 120° C. and 40° C.

After evaporating in a 10 cm air-gap, the nascent fiber entered into a coagulation bath at 30° C. to solidify. Membrane was subsequently collected with a winding speed of 45 m/min.

(3) Post-Treatment of Hollow Fiber Membrane

The collected hollow fibers were soaked in aqueous ethanol with different concentration in turn for 1 hour, and the residual solvents and additives were removed and then dried in air.

Figure 9:
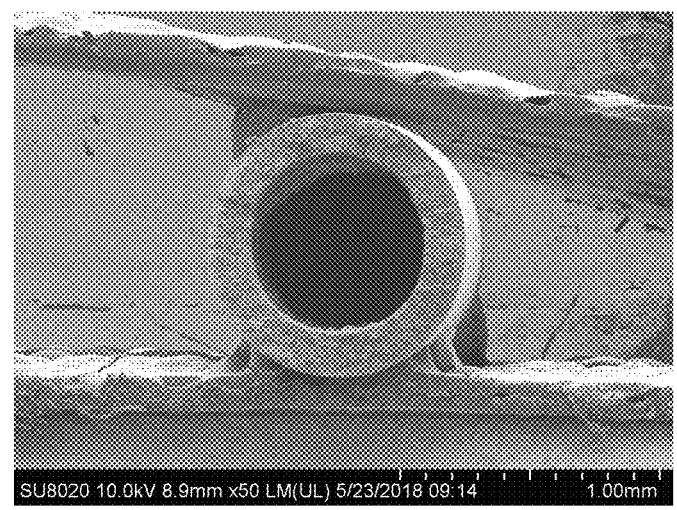
FIG. 9 shows the cross section SEM micrograph of hollow fiber membrane prepared in embodiment 3.
Figure 10:
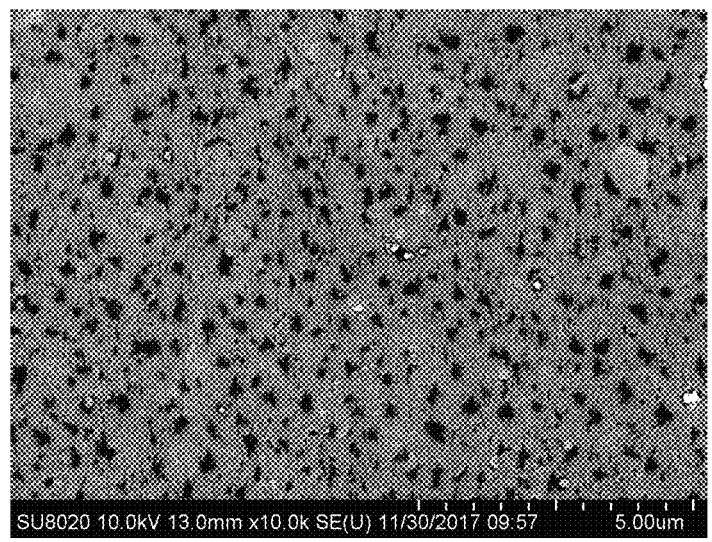
FIG. 10 shows the inner surface SEM micrograph of hollow fiber membrane prepared in embodiment 3.
Figure 11:
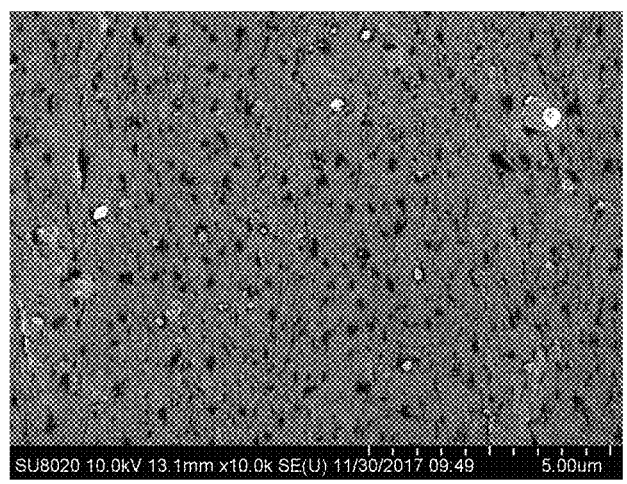
FIG. 11 shows the outer surface SEM micrograph of hollow fiber membrane prepared in embodiment 3.

The hollow fiber membrane prepared in this embodiment was observed by electron microscopy, and the relevant SEM images were shown in FIGS. 9-11, respectively. From FIGS. 9-11, it could be seen that expected porous inner and outer surfaces existed, and dense skins disappeared.

The physical parameters of hollow fiber membrane prepared in this embodiment were tested, and the test results were shown as the following: The average and maximum pore diameters were 0.226 μm and 0.299 μm, respectively. The total porosity was 65%, indicating that the hollow fiber membrane prepared in this embodiment was a typical microfiltration membrane, and it could be used in membrane distillation.

Hollow fiber membrane provided in this embodiment was used in DCMD. When the hot and cold side liquid was pure water at 20° C. and 70° C. respectively, its permeate flux was 40 kg·m$^{-2}$h$^{-1}$. Comparing with the existing technology, the hollow fiber membrane provided in this embodiment had great significance in improving the permeate flux.

Embodiment 4

(1) Preparation of Outer Solution, Casting Solution and Bore Fluid.

Outer solution was ethylene glycol. Casting solution included polysulfone (polymer), N,N-dimethyl acetamide (solvent) and polyethylene glycol 200 (additive). The three substances were uniformly mixed at 120° C. according to the mass percentage of 15%, 60% and 25%, respectively. Bore fluid was glycerin and the coagulation bath was a mixture of water and N,N-dimethyl acetamide (mass percentage 10%).

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 14 ml/min, 13 ml/min and 15 ml/min, respectively. The temperature of the outer solution, casting solution and bore fluid were 80° C., 120° C. and 40° C.

After evaporating in a 10 cm air-gap, the nascent fiber entered into a coagulation bath at 30° C. to solidify. Membrane was subsequently collected with a winding speed of 45 m/min.

(3) Post-Treatment of Hollow Fiber Membrane

The collected hollow fibers were soaked in aqueous ethanol with different concentration in turn for 1 hour, and the residual solvents and additives were removed and then dried in air.

The physical parameters of hollow fiber membrane prepared in this embodiment were tested, and the test results were shown as the following: The average and maximum pore diameters were 0.315 μm and 0.401 μm, respectively. The total porosity was 71%, indicating that the hollow fiber membrane prepared in this embodiment was a typical microfiltration membrane, and it could be used in membrane distillation.

The hollow fiber membrane provided in this embodiment was used in DCMD. When the hot and cold side liquid was pure water at 20° C. and 70° C. respectively, its permeate flux was 50 kg·m$^{-2}$h$^{-1}$. Comparing with the existing technology, the hollow fiber membrane provided in this embodiment had great significance in improving the permeate flux.

Embodiment 5

(1) Preparation of Outer Solution, Casting Solution and Bore Fluid

Outer solution was diethylene glycol. Casting solution included polyvinylidene fluoride (polymer), dimethyl sulfoxide (solvent) and polyethylene glycol 800 (additive). The three substances were uniformly mixed at 80° C. according to the mass percentage of 13%, 79% and 8%, respectively. Bore fluid was polyethylene glycol 800 and the coagulation bath was a mixture of water and N,N-dimethyl acetamide (mass percentage 10%).

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 14 ml/min, 13 ml/min and 15 ml/min, respectively. The temperature of the outer solution, casting solution and bore fluid were 100° C., 80° C. and 120° C.

After evaporating in a 0 cm air-gap, the nascent fiber entered into a coagulation bath at 60° C. to solidify. Membrane was subsequently collected with a winding speed of 23 m/min.

(3) Post-Treatment of Hollow Fiber Membrane

The collected hollow fibers were soaked in aqueous ethanol with different concentration in turn for 1 hour, and the residual solvents and additives were removed and then dried in air.

Figure 12:
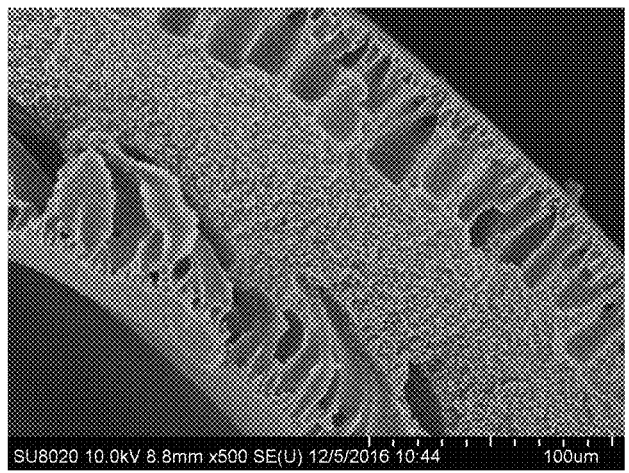
FIG. 12 shows the amplified SEM micrograph of local section of hollow fiber membrane prepared by embodiment 5.
Figure 13:
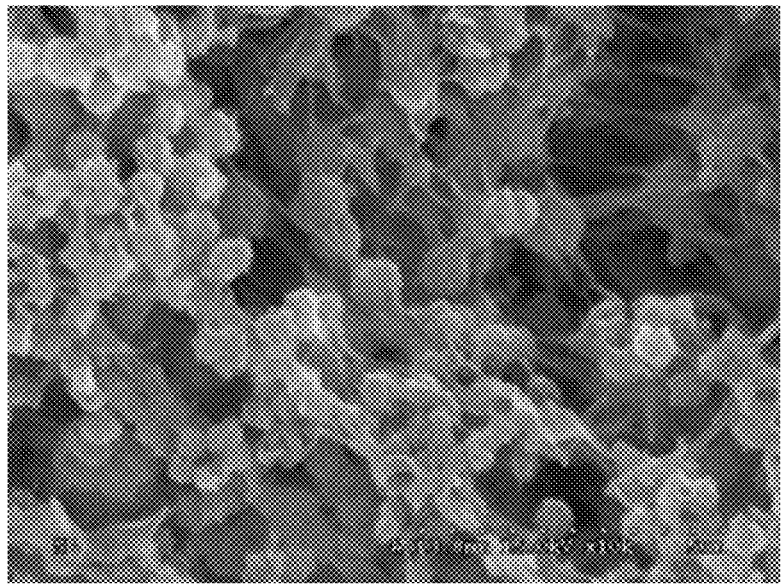
FIG. 13 shows the inner surface SEM micrograph of hollow fiber membrane prepared in embodiment 5.
Figure 14:
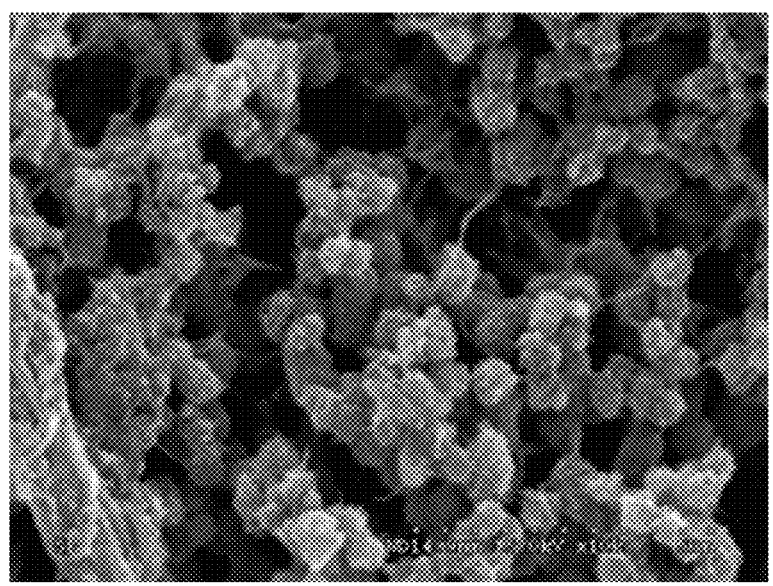
FIG. 14 shows the outer surface SEM micrograph of hollow fiber membrane prepared in embodiment 5.

The hollow fiber membrane prepared in this embodiment was observed by electron microscopy, and the relevant SEM images were shown in FIGS. 12 to 14, respectively. From FIGS. 12 to 14, it could be seen that expected microporous inner and outer surfaces existed, and dense skins disappeared.

The physical parameters of hollow fiber membrane prepared in this embodiment were tested, and the test results were shown as the following: The average and maximum pore diameters were 0.320 μm and 0.335 μm, respectively. The total porosity was 78%, indicating that the hollow fiber membrane prepared in this embodiment was a typical microfiltration membrane, and it could be used in membrane distillation.

Hollow fiber membrane provided in this embodiment was used in DCMD. When the hot and cold side liquid was pure water at 20° C. and 70° C. respectively, its permeate flux was 80 kg·m$^{-2}$h$^{-1}$. Comparing with the existing technology (for example, the permeate flux was about 20 kg·m$^{-2}$h$^{-1}$), the hollow fiber membrane provided in this embodiment greatly increased the permeate flux.

Embodiment 6

(1) Preparation of Outer Solution, Casting Solution and Bore Fluid

Outer solution was diethylene glycol. Casting solution included polyvinylidene fluoride (polymer), a mixture of triethyl phosphate and N-methyl pyrrolidone (mass percentage 10%) (solvent), and polyethylene glycol 800 (additive). The three substances were uniformly mixed at 100° C. according to the mass percentage of 13%, 79% and 8%, respectively. Bore fluid was polyethylene glycol 800 and the coagulation bath was water.

(2) Preparation of Hollow Fiber Membrane

The hollow fiber membrane was prepared by a spinning device with a triple-orifice spinneret. The outer solution, casting solution and bore fluid flowed through the outer, middle and inner orifice of the triple-orifice spinneret, respectively. Their flowrates were 15 ml/min, 15 ml/min and 18 ml/min, respectively. The temperature of the outer solution, casting solution and bore fluid were 100° C., 80° C. and 120° C.

After evaporating in a 0 cm air-gap, the nascent fiber entered into a coagulation bath at 60° C. to solidify. Membrane was subsequently collected with a winding speed of 25 m/min.

(3) Post-Treatment of Hollow Fiber Membrane

The collected hollow fibers were soaked in aqueous ethanol with different concentration in turn for 1 hour, and the residual solvents and additives were removed and then dried in air.

The physical parameters of hollow fiber membrane prepared in this embodiment were tested, and the test results were shown as the following: The average and maximum pore diameters were 0.379 μm and 0.417 μm, respectively. The total porosity was 80%, indicating that the hollow fiber membrane prepared in this embodiment was a typical microfiltration membrane, and it could be used in membrane distillation.

Hollow fiber membrane provided in this embodiment was used in DCMD. When the hot and cold side liquid was pure water at 20° C. and 70° C. respectively, its permeate flux was 90 kg·m$^{-2}$h$^{-1}$. Comparing with the existing technology (for example, the permeate flux was about 20 kg·m$^{-2}$h$^{-1}$), the hollow fiber membrane provided in this embodiment greatly increased the permeate flux.

The above is only for the technical personnel in this field to conveniently understand the technical scheme of this invention and is not used to restrict the invention. Within the spirit and principles of this invention, any modification, equivalent replacement, improvement, etc. should be included in the protection of this invention.

What is claimed is:

1. A preparation method for a hollow fiber membrane, comprising providing a spinning device with a triple-orifice spinneret; further comprising:
    providing a casting solution, a bore fluid and an outer solution;
    simultaneously extruding the outer solution, the casting solution and the bore fluid from an inner orifice, a middle orifice and an outer orifice of a triple-orifice spinneret, respectively, to form a nascent membrane comprising nascent hollow fiber formed by the casting solution, a liquid film on an external surface of the nascent hollow fiber formed by the outer solution, and a further liquid film on an inner surface of the nascent hollow fiber formed by the bore fluid;
    immersing the nascent membrane in an external coagulation bath to form a hollow fiber membrane,
    wherein a presence of the liquid film and the further liquid film on the nascent hollow fiber inhibits formation of double dense skins in the hollow fiber membrane,
    wherein the casting solution comprises a membrane-forming material, solvents, and additives in a mass ratio of 13-35%, 40-85% and 2-25%, respectively,
    wherein the outer solution and the bore fluid are weakly-polar non-solvents of the membrane-forming material and are water soluble,
    wherein the outer solution and the bore fluid are selected from alcohols, and the alcohols are selected from the group consisting of polyethylene glycol 200, polyethylene glycol 400, polyethylene glycol 600, polyethylene glycol 800 and diethylene glycol, and the alcohols also act as the additives in the casting solution,
    wherein the membrane-forming material in the casting solution is selected from the group consisting of polyvinylidene fluoride polymer, polysulfone, polyethersulfone, sulfonated polysulfone, sulfonated polyethersulfone, polyacrylonitrile and cellulose acetate,
    wherein the solvents are solvents configured to dissolve the membrane-forming material, and
    wherein the temperature of the casting solution is 80° C.-180° C., and the temperature of the outer solution and/or the bore fluid are 20° C.-120° C.

2. The preparation method according to claim 1, wherein the flowrates of the outer solution, the casting solution, and the bore fluid during the co-extruding process by the triple-orifice spinneret are kept within 10-30 ml/L.

3. The preparation method according to claim 1, wherein a microstructure of the hollow fiber membrane is controlled by adjusting the composition and temperature of at least one of the outer solution, the bore fluid, and the external coagulation bath.

4. The preparation method according to claim 1, wherein the temperature of coagulation bath is 20° C.-60° C.

* * * * *